Dec. 22, 1936.  R. H. CARR ET AL  2,064,969
APPARATUS AND METHOD OF DISTRIBUTING PRESSURE
DIFFERENTIAL ACROSS PISTON RINGS OR PACKINGS
Filed May 31, 1934

INVENTORS
Richard H. Carr
Laurence A. Ogden
BY
W S McDowell ATTORNEY

Patented Dec. 22, 1936

2,064,969

UNITED STATES PATENT OFFICE 2,064,969

APPARATUS AND METHOD OF DISTRIBUTING PRESSURE DIFFERENTIAL ACROSS PISTON RINGS OR PACKINGS

Richard H. Carr, Evanston, Ill., and Laurence A. Ogden, Tulsa, Okla., assignors to The Pure Oil Company, Chicago, Ill., a corporation of Ohio Application May 31, 1934, Serial No. 728,294

15 Claims. (Cl. 309—31)

This invention relates to apparatus and method for distributing pressure differential across piston rings or packings.

Piston rings or packings, used for the purpose of holding pressure from escaping between sliding surfaces, as for example, between a piston and the walls of a cylinder in which it is mounted, are made so that they will expand under pressure against the walls of the cylinder or the housing and prevent leakage. If the pressure in the cylinder is high, it is possible that the first ring or the ring closest to the pressure side of the cylinder will be forced against the cylinder wall with a pressure sufficient to break down lubrication and cause excess wear and friction.

The object of our invention is to provide means which will enable the pressure differential across the piston rings or packings to be substantially equally distributed and regulated in such manner that leakage and abnormal wear is reduced to a minimum, resulting in a higher mechanical efficiency and longer surface life of the wearing parts.

In order to accomplish this we provide passageways from the pressure side of the cylinder to the spaces between the piston rings or packings, and provide the passageways with loaded valves adjusted to varying pressures which permit an adjusted amount of pressure to exist between piston rings during the working part of the stroke. We also connect the spaces between the rings to the pressure side of the cylinder by means of a second set of passageways provided with check valves which permit the pressure which has built up between the rings to be bled into the compression space of the cylinder upon the return stroke of the piston so that the pressure on the rings is substantially entirely released. As a result of this construction there is a substantially equal pressure drop across each ring during the compression stroke and a release of pressure during the return stroke.

Our invention may be used in connection with pumps, compressors, or engine cylinders operating under either pressure or vacuum.

Figure 1:
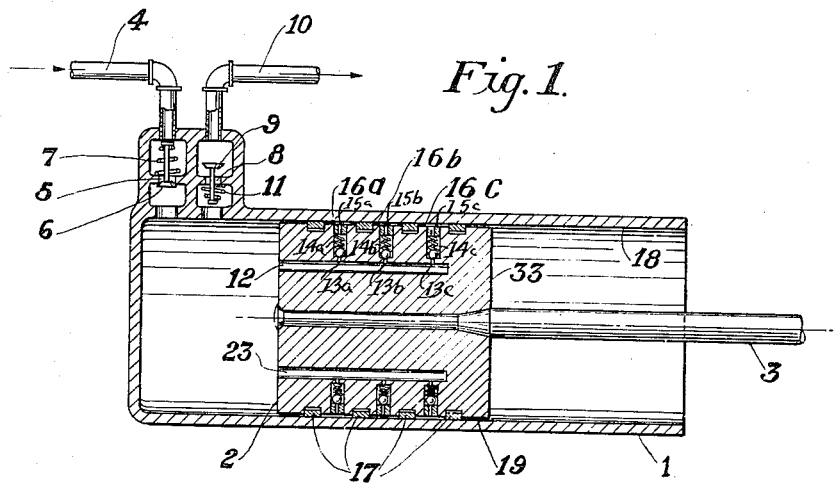
Figure 2:
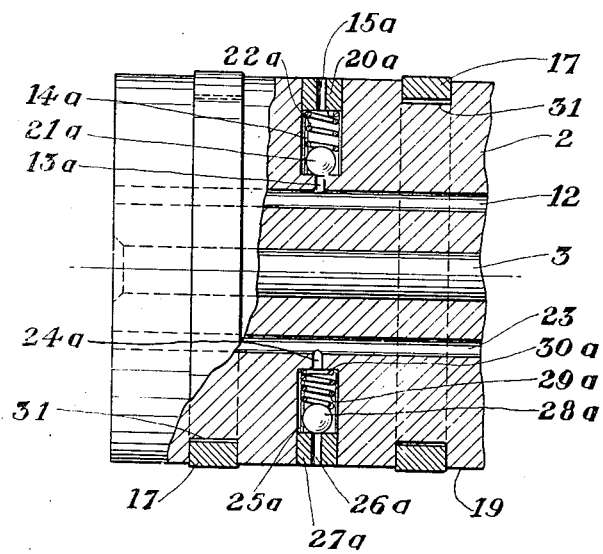

In the accompanying drawing, which illustrates one way of carrying out the invention, Fig. 1 is a vertical sectional view through a cylinder and piston showing our invention, and Fig. 2 is an enlarged vertical view partly in section of a portion of the piston shown in Fig. 1.

Referring to the drawing the numeral 1 designates a cylinder, 2 a solid piston slidably mounted therein, and 3 a piston rod to which the piston 2 is rigidly connected. The fluid enters the cylinder through pipe 4 and inlet port 5 controlled by poppet valve 6 which is normally held in a closed position by spiral spring 7. The valve 6 opens downwardly. The fluid is exhausted from the cylinder through port 8 controlled by poppet valve 9 and thence through exit pipe 10. The valve 9 is held in a normally closed position by spiral spring 11. The valve 9 opens upwardly.

In the piston 2 is a passageway 12 which terminates at the surface of the piston on the working face thereof and terminates on the other end short of the surface of the piston. The passageway 12 is connected by ports 13a, 13b, 13c, recesses 14a, 14b, 14c, and ports 15a, 15b, 15c to the spaces 16a, 16b, 16c, bounded by adjacent piston rings 17, the inside wall 18 of the cylinder and the periphery 19 of the piston. Plugs 20a, 20b, 20c, having ports 15a, 15b, 15c, are rigidly fixed in the outer ends of the recesses 14a, 14b, 14c, and the outer surfaces of these plugs are flush with the periphery 19 of the piston. Ball valves 21a, 21b, 21c are seated on the inner end of ports 13a, 13b, 13c, and are held in closed position by means of spiral springs 22a, 22b, 22c, which in turn are seated on the inner side of the plugs 20a, 20b, 20c.

A second passageway 23, similar in all respects to passageway 12, is bored in the piston 2. This passageway is connected with the spaces 16a, 16b, 16c between the piston rings by means of ports 24a, 24b, 24c, recesses 25a, 25b, 25c, and ports 26a, 26b, 26c to the spaces 16a, 16b, 16c. The ports 26a, 26b, 26c are formed in plugs 27a, 27b, 27c which are rigidly fixed in the outer ends of the recesses 25a, 25b, 25c and are flush with the periphery 19 of the piston. Ball valves 28a, 28b, 28c are seated on the inner end of the ports 26a, 26b, 26c and are held in closed position by means of spiral springs 29a, 29b, 29c which are in turn seated on the inner ends 30a, 30b, 30c of the recesses 25a, 25b, 25c. At spaced intervals along the periphery of the piston are placed piston rings 17 which fit into recesses 31 of the piston.

The valves 21a, 21b, 21c are loaded with pressures by means of the springs 22a, 22b, 22c, increasing from the valve closet to the working side of the piston to the valve most remote therefrom. In order to load the valves with different pressures, the springs 22a, 22b, 22c which hold the valves in closed position, are of different tensions so that the spring 22a is of less tension than spring 22b, and it is in turn of less tension than 22c. For example, if the pressure built up in the cylinder is 1200 pounds per square inch, valve 22a would be set to open at 300 pounds, valve 22b would be set to open at 600 pounds, and valve 22c would be set to open at 900 pounds. As a result thereof the pressure in the space 16a would be 900 pounds per square inch, that in space 16b would be 600 pounds per square inch, and that in space 16c would be 300 pounds per square inch. Thus the pressure differential across each piston ring would be 300 pounds. Therefore, instead of having the piston ring closest to the working face of the piston carry substantially the entire pressure, each ring will carry an equal amount which will be in this particular case, one fourth of the entire load.

When the piston has moved to the end of its compression stroke and starts backward on its return stroke, the pressure between the rings, when greater than the admission pressure, is sufficient to open the check valves 28a, 28b, 28c and release the pressure between the rings. The springs 29a, 29b, 29c which hold these check valves in closed position are of low tension, being sufficient only to hold the valves 28a, 28b, 28c in closed position and therefore easily permit the pressure between the rings to be bled back into the compression chamber.

It will be obvious that the number of rings and the number of ports can be increased or diminished as requirements dictate. If the apparatus is to be used with small pressures, a lesser number of rings may be used, and vice versa if pressures, greater than those mentioned, are to be built up, it may be advisable to use a greater number of rings in order to keep down pressure differential across each ring. It will also be obvious that in the event hollow pistons are used, passageways may be formed from the working face of the piston to the spaces between the piston rings.

The invention is also applicable to double acting pistons and cylinders. In order to provide for equal pressure differentials across the rings or packings on both strokes of the piston, another set of passageways from the opposite face 33 of the piston to the spaces 16a, 16b, 16c are provided, similar to the passageways heretofore described. However in this case it will be necessary to load the check valves 28a, 28b, 28c with definite loads capable of holding pressure in the spaces 16a, 16b, 16c and the valves corresponding to check valves 28a, 28b, 28c and to valves 21a, 21b, 21c controlling the passageways to face 33 of the piston, will have to be loaded in the opposite order. Thus in the particular case where pressures of 1200 pounds per square inch are attained, check valve 28a will be loaded to 300 pounds per square inch, 28b will be loaded to 600 pounds per square inch and valve 28c will be loaded to 900 pounds per square inch in order to hold these pressures in the spaces 16a, 16b, 16c when pressure is built up against face 33 of the piston. While the rings or packings, in the case of double acting pistons and cylinders are at all times subjected to pressure, it will be seen that the pressure is evenly distributed at all times and proportionately cuts down the wear that results when the end ring or packing is required to carry the entire load.

The invention may be applied to apparatus using either rigid rings, such as metallic piston rings, or flexible packing members.

Another manner in which our invention may be applied to double acting pistons and cylinders is to supply two sets of rings or packings, one on each end of the piston, with separate passageways and control valves for each set. One set of passageways will act to distribute pressure across one set of rings or packings when compressing in one direction and release the pressures during suction, while the other set will distribute pressure across the other set of rings or packings when compressing in the opposite direction and release the pressures during suction. In this way, while only half the rings or packings are acting to distribute pressure at any time, the entire pressure is released on the particular set of rings or packings during suction.

Although we have shown a preferred embodiment of our invention, it is to be understood that the invention includes equivalent means for distributing pressures across rings or packings during compression and for releasing pressure during suction.

We claim:

1. Apparatus of the character described comprising a cylinder, a piston slidably mounted therein, a plurality of spaced rings or packing members on said piston, valve controlled means to admit fluid under regulated pressure to the spaces between said rings or packing members and to maintain gradually diminishing pressures in said spaces in the direction remote from the compression side of the piston, and means for releasing pressure in said spaces during the return stroke of the piston.

2. Apparatus of the character described comprising a cylinder, a piston slidably mounted therein, a plurality of rings or packing members on said piston defining spaces between the piston and cylinder wall, valve controlled means for maintaining fluid under regulated pressure substantially less than that existing on the compression side of said piston in said spaces during the compression stroke of said piston, and means for releasing the fluid pressure in said spaces during the return stroke of the piston.

3. Apparatus of the character described comprising a cylinder, a piston slidably mounted therein, a plurality of rings or packing members on said piston defining spaces between the piston and cylinder wall, valve controlled means for admitting fluid under regulated pressure to said spaces during the compression stroke of the piston, said means being adjusted to admit fluid under predetermined pressure gradually decreasing in the spaces in the direction most remote from the compression side of the piston, and means to release the fluid pressure in said spaces during the return stroke of the piston.

4. Apparatus of the character described comprising a cylinder, a piston slidably mounted therein, a plurality of rings or packing members on said piston defining spaces between the piston and cylinder wall, valve controlled means for admitting fluid under regulated pressure substantially less than that existing on the compression side of said piston to said spaces during the compression stroke of said piston, and means to relieve excess fluid pressure from said spaces during the return stroke of said piston.

5. Apparatus of the character described comprising a cylinder, a piston slidably mounted therein, a plurality of rings or packing members on said piston defining spaces between the piston and cylinder wall, valve controlled means for admitting fluid under regulated pressure to said spaces during the compression stroke of the piston, said means being adjusted to admit fluid under pressure gradually decreasing in the spaces in the direction most remote from the compression side of the piston, and means to release the excess fluid pressure in said spaces during the return stroke of the piston.

6. Apparatus of the character described comprising a cylinder, a piston slidably mounted therein, rings or packing members on said piston defining spaces between the piston and cylinder wall, passageways connecting said spaces to the interior of said cylinder, valves in said passageways for controlling the admission of fluid into said passageways, and valve controlled passageways connecting said spaces to the interior of said cylinder for exhausting fluid from said passageways.

7. Apparatus of the character described comprising a cylinder, a piston slidably mounted therein, rings or packing members on said piston defining spaces between the piston and cylinder wall, passageways connecting said spaces to the interior of said cylinder, valves in said passageways adjusted to admit fluid, decreasing in pressure toward the end remote from the compression side of the piston, to said spaces, and valve controlled passageways for exhausting fluid from said spaces.

8. Apparatus of the character described comprising a cylinder, a piston slidably mounted therein, rings or packing members on said piston defining spaces between the piston and cylinder wall, passageways connecting said spaces to the interior of said cylinder, valves in said passageways adjusted to admit fluid, decreasing in pressure toward the end remote from the compression side of the piston, to said spaces, and valve controlled passageways for exhausting fluid from said spaces, said last mentioned valves being adjusted to exhaust at pressure gradually decreasing toward the compression side of said piston.

9. A pumping or compressing device comprising a cylinder, a piston slidably mounted therein, rings or packing members on said piston defining spaces between the piston and cylinder wall, passageways connecting said spaces to the interior of said cylinder, valves in said passageways adjusted to admit fluid undergoing pumping or compression to said spaces at a lower pressure than that under which the fluid is being pumped or compressed, and means for exhausting fluid from said spaces during the suction stroke.

10. Device in accordance with claim 9 in which means for exhausting fluid from said spaces to said cylinder during the suction stroke include separate valve controlled passageways.

11. A pumping or compressing device comprising a cylinder, a piston slidably mounted therein, rings or packing members on said piston defining spaces between the piston and cylinder wall, passageways connecting said spaces to the interior of said cylinder, valves in said passageways adjusted to admit fluid undergoing pumping or compression to said spaces at pressures gradually decreasing in the direction remote from the compression side of the piston, and means for exhausting fluid from said spaces during the suction stroke.

12. Means for balancing the pressure exerted on a series of rings or packing members surrounding a member slidably mounted in a cylinder which comprises valve controlled passageways connecting the interior of said cylinder to the spaces between said rings or packing members, the valves in said passageways being adjusted to admit fluid to said spaces at a pressure gradually decreasing in the direction away from the high pressure end of said cylinder, and means to release the pressure in said spaces.

13. Pressure balancing means in accordance with claim 12 in which the valves in said passageways are of the automatically closing type.

14. Pressure balancing means in accordance with claim 12 in which the means to release the pressure in said spaces comprises separate valve controlled passageways.

15. Apparatus of the character described comprising a cylinder, a piston slidably mounted therein, a plurality of spaced rings or packing members on said piston, means to simultaneously admit fluid under regulated pressure to each of the spaces between said rings or packing members and to maintain gradually diminishing pressures in said spaces in the direction remote from the compression side of the piston, and means for releasing pressure in said spaces during the return stroke of the piston.

RICHARD H. CARR.
LAURENCE A. OGDEN.